(12) United States Patent
Humphrey et al.

(10) Patent No.: US 8,588,285 B2
(45) Date of Patent: Nov. 19, 2013

(54) METHOD AND APPARATUS FOR OPERATING A DIGITAL SUBSCRIBER LINE ARRANGEMENT

(75) Inventors: Leslie Derek Humphrey, Ipswich (GB); Andrew David Wallace, Harlow Essex (GB)

(73) Assignee: British Telecommunications Public Limited Company, London (GB)

( * ) Notice: Subject to any disclaimer, the term of this patent is extended or adjusted under 35 U.S.C. 154(b) by 211 days.

(21) Appl. No.: 13/078,166

(22) Filed: Apr. 1, 2011

(65) Prior Publication Data

US 2012/0250744 A1 Oct. 4, 2012

(51) Int. Cl.
*H04B 1/38* (2006.01)

(52) U.S. Cl.
USPC ........... 375/222; 375/219; 375/220; 375/221; 375/224; 375/227; 375/257; 375/260; 375/295; 375/316; 455/73; 455/91; 455/130; 455/279.1; 455/282; 455/284; 370/272; 370/273; 370/276; 370/297; 370/522; 379/27.01; 379/90.01; 379/414; 379/417; 725/111

(58) Field of Classification Search
USPC ......... 375/219, 220, 221, 222, 224, 227, 257, 375/260, 295, 316; 455/73, 91, 130, 279.1, 455/282, 284; 370/272, 273, 276, 297, 445, 370/522; 379/27.01, 90.01, 414, 417; 725/111
See application file for complete search history.

(56) References Cited

U.S. PATENT DOCUMENTS

| | | | | |
|---|---|---|---|---|
| 6,650,697 | B1 * | 11/2003 | Tate et al. | 375/222 |
| 2007/0259680 | A1 * | 11/2007 | Stolle et al. | 455/522 |
| 2008/0317161 | A1 * | 12/2008 | Pascal | 375/295 |

* cited by examiner

Primary Examiner — Leon Flores
(74) Attorney, Agent, or Firm — Patterson Thuente Pedersen, P.A.

(57) ABSTRACT

A digital subscriber line arrangement includes a downstream modem, an upstream modem and a copper pair connection between the modems. Each modem includes electrical length estimation function code means which causes the respective modem to measure the attenuation of signals transmitted by the other modem at a plurality of different frequencies, and to combine these measurements, or functions thereof, together to form a combined attenuation measure and to use this combined measure to form an electrical length estimation, KL0bis. The downstream modem is operable to transmit its electrical length estimation to the upstream modem, and the upstream modem is operable to generate a definitive electrical length estimation in dependence upon both the received estimation from the downstream modem and the estimation made by the upstream modem. Having generated a definitive electrical length estimation, the upstream modem is operable to transmit this to the downstream modem. Finally, the downstream modem includes Upstream Power Back Off mask generation function code means which causes the downstream modem to use the received definitive electrical length estimation to generate an upstream power back off mask for use in controlling the amount of power used when transmitting upstream signals over the copper pair connection to the upstream modem in one or more upstream transmission bands.

14 Claims, 7 Drawing Sheets

METHOD AND APPARATUS FOR OPERATING A DIGITAL SUBSCRIBER LINE ARRANGEMENT

TECHNICAL FIELD

The present invention relates to a method and apparatus for operating a digital subscriber line and more particularly to a DSL modem (and to an access device or sub-system such as a Digital Subscriber Line Access Multiplexer (DSLAM) or similar access node—e.g. a Multiple Services Access Node (MSAN)) terminating a digital subscriber line and a method of operating such a modem in which a new measurement is used in order to determine an electrical length estimate which in turn is used to control the transmit power to be used by the upstream transmitter elements within the DSL modem.

BACKGROUND

Digital subscriber lines are twisted copper pair lines with Digital Subscriber Line (DSL) modems operating at both ends of the line. This permits data to be communicated over a line at much greater data rates than is achievable with old voice-band modems operating over the same twisted copper pairs and is generally therefore referred to as "DSL broadband". The DSL modems operate in accordance with various DSL standards agreed by the International Telecommunication Union (ITU). Over time newer DSL standards have been developed which permit ever greater data transmission rates to be achieved over digital subscriber lines. Furthermore, there is a desire to avoid the need to fit a service specific faceplate, thereby enabling DSL broadband to be provided on a self-install basis, avoiding the need for an engineer to visit the customer premises, keeping costs down to a minimum. The presence of home wiring then results in bridged taps being present in the circuit. These bridged taps cause deep zeroes in the insertion loss characteristic (i.e. in the amount of attenuation as discussed below), making it difficult to ascertain the loop length accurately for the purposes of upstream power back off Power Spectral Density (PSD) control (upstream power back off is discussed in greater detail below).

The physical length of twisted copper pair lines between a network side DSL modem located in, for example, a local Exchange or Central Office, or indeed in a street cabinet or a drop point (in VDSL systems it is often envisaged that the DSLAM may be placed much closer to the customer's premises than in the exchange) and a customer's premises may vary considerably from line to line. In general, the longer a line is, the greater will be the attenuation of a signal transmitted over the line by the time the signal reaches the far end. Furthermore, other factors in addition to the physical length of the line may affect the amount of attenuation suffered. This leads to the concept of the electrical length of a line, generally referred to in DSL literature (such as, for example, VDSL2 ITU standard G.993.2.) as $kl_0$. In order to control the adverse impact of non-reciprocal crosstalk in the upstream direction, steps must be taken to equalise the received powers at the upstream VDSL CO or cabinet modem. In general the greater the electrical length, $kl_0$, of the line, the more power with which a signal needs to be transmitted onto the line in order for it to be correctly detectable at the far end.

A particular problem experienced by DSL connections operating at increasingly higher frequencies (e.g. the VDSL standard uses higher frequencies than say ADSL1, etc.—in particular VDSL2 uses an additional band of frequencies for upstream transmissions at much higher frequencies than those used for upstream transmissions in ADSL for example) is known as FEXT (Far End CROSS Talk). This is noise (carried onto an adjacent line just before the lines reach a common receiver device) which is caused by signals transmitted at the far end of the common receiver device end (especially when the common receiver device is say a DSLAM and the lines are in a common binder connected to the DSLAM located in, for example, a Local Exchange or Central Office, or a cabinet or at a drop point, etc.). The noise is created by a customer premises DSL modem on an adjacent line—note that the interfering and the "victim" customer premises DSL modems might be somewhat distant from each other—in fact particular problems arise when the interfering modem is rather close to the DSLAM whereas the "victim" modem is located much further away from the DSLAM).

FEXT is a particular issue for VDSL2 because in VDSL2 (as specified in ITU standard G 993.2) a second upstream band of frequencies is used from approx. 3.0 MHz to 5.1 MHz, and, as mentioned above, FEXT becomes a more significant problem at higher frequencies. G 993.2 therefore specifies that DSL modems perform an estimation of the electrical length, $kl_0$, of the line over which the DSL connection is to be made, before such a connection is fully established. Furthermore, in many regions local PSD regulations, such as the UK Access Network Frequency Plan, specify that based on this estimation, an Upstream Power Back Off (UPBO) mask should be set to control the power used for upstream transmissions carried in the second upstream band of frequencies from approximately 3.0 MHz-5.1 MHz. In this way customer premises modems which are very close to the exchange should transmit at lower power levels compared to modems which are located much further from the exchange so as to minimise the FEXT impact of the "short" lines on "long" lines.

The exact way in which this parameter is determined is not currently specified by the standards but rather it can be determined in any manner deemed appropriate by DSL modem manufacturers. Indeed the standard seems to anticipate that both the network-side DSL modem and the customer side DSL modem may make an estimation of $kl_0$ (since there is provision for both of these devices to send a message containing such an estimation from one device to the other) but no guidance is given as to which of these estimations should be used by the customer side DSL modem in order to generate its UPBO mask, or whether, for example, they should be combined in some way. The standard does include a note (see G 993.2 section 7.2.1.3.2) suggesting one possible approach for estimating $kl_0$ (this method involves identifying the insertion loss at an unspecified number of different frequencies (provided they are within the range of frequencies between 1 MHz and the maximum usable VDSL2 frequency applicable to the modem—and selecting the minimum value of the ratio of the insertion loss to the square root of the frequency at however many different frequencies are selected for evaluation of this ratio, which could be just one). In general, however, many modems calculate this value based on only one or very few measurements at different frequencies of the amount of the insertion loss (i.e. the attenuation experienced by signals received over the line).

SUMMARY

According to an embodiment, a DSL modem is arranged to measure the attenuation of signals (or some measure associated therewith) at a plurality of different frequencies and to combine these measurements together to form a combined attenuation measure and to use this combined measure to form an electrical length estimation, and then to use the electrical length estimation thus formed to generate an upstream power back off mask for use in controlling the amount of power used when transmitting signals upstream over a copper pair connection to which the modem is connected in one or more upstream transmission bands.

According to an embodiment, a digital subscriber line arrangement comprises a customer premises side modem, a network side modem and a copper pair connection between the modems, wherein each modem is arranged to measure the attenuation of signals transmitted by the other modem (or some measure associated therewith) at a plurality of different frequencies and to combine these measurements together to form a combined attenuation measure and to use this combined measure to form an electrical length estimation, and wherein the customer premises modem is operable to use one or other or both of the electrical length estimations thus formed to generate an upstream power back off mask for use in controlling the amount of power used when transmitting signals over the copper pair connection to the network side modem in one or more upstream transmission bands.

According to an embodiment, a method of operating a digital subscriber line modem comprises measuring at the modem the attenuation of signals received by the modem (or some measure associated therewith) at a plurality of different frequencies and combining these measurements together to form a combined attenuation measure and using this combined measure to form an electrical length estimation, and then the modem using the electrical length estimation thus formed to generate an upstream power back off mask for use in controlling the amount of power used when transmitting signals upstream over a copper pair connection to which the modem is connected in one or more upstream transmission bands.

According to an embodiment, a method of operating a digital subscriber line arrangement comprises a customer premises side modem, a network side modem and a copper pair connection between the modems, wherein at least one of the modems measures the attenuation of signals transmitted by the other modem (or some measure associated therewith) at a plurality of different frequencies and combines these measurements together to form a combined attenuation measure and uses this combined measure to form an electrical length estimation, and wherein the customer premises modem uses the electrical length estimation, or one or other or both of the electrical length estimations when both modems generate an estimation in this way, to generate an upstream power back off mask and controls the amount of power used when transmitting signals over the copper pair connection to the network side modem in one or more upstream transmission bands in accordance with the generated upstream power back off mask.

Additional embodiments include processor implementable instructions for causing a processor controlled device to carry out the method of the third or fourth aspects of the present invention and carrier means, preferably tangible carrier means such as a magnetic or optical storage disc (e.g. a hard drive platter, or a CD or DVD) or a solid state storage device (e.g. a usb mini-drive, etc.), carrying such processor implementable instructions.

BRIEF DESCRIPTION OF THE DRAWINGS

In order that the present invention may be better understood, embodiments thereof will now be described, by way of example only, with reference to the accompanying drawings in which.

Figure 1:
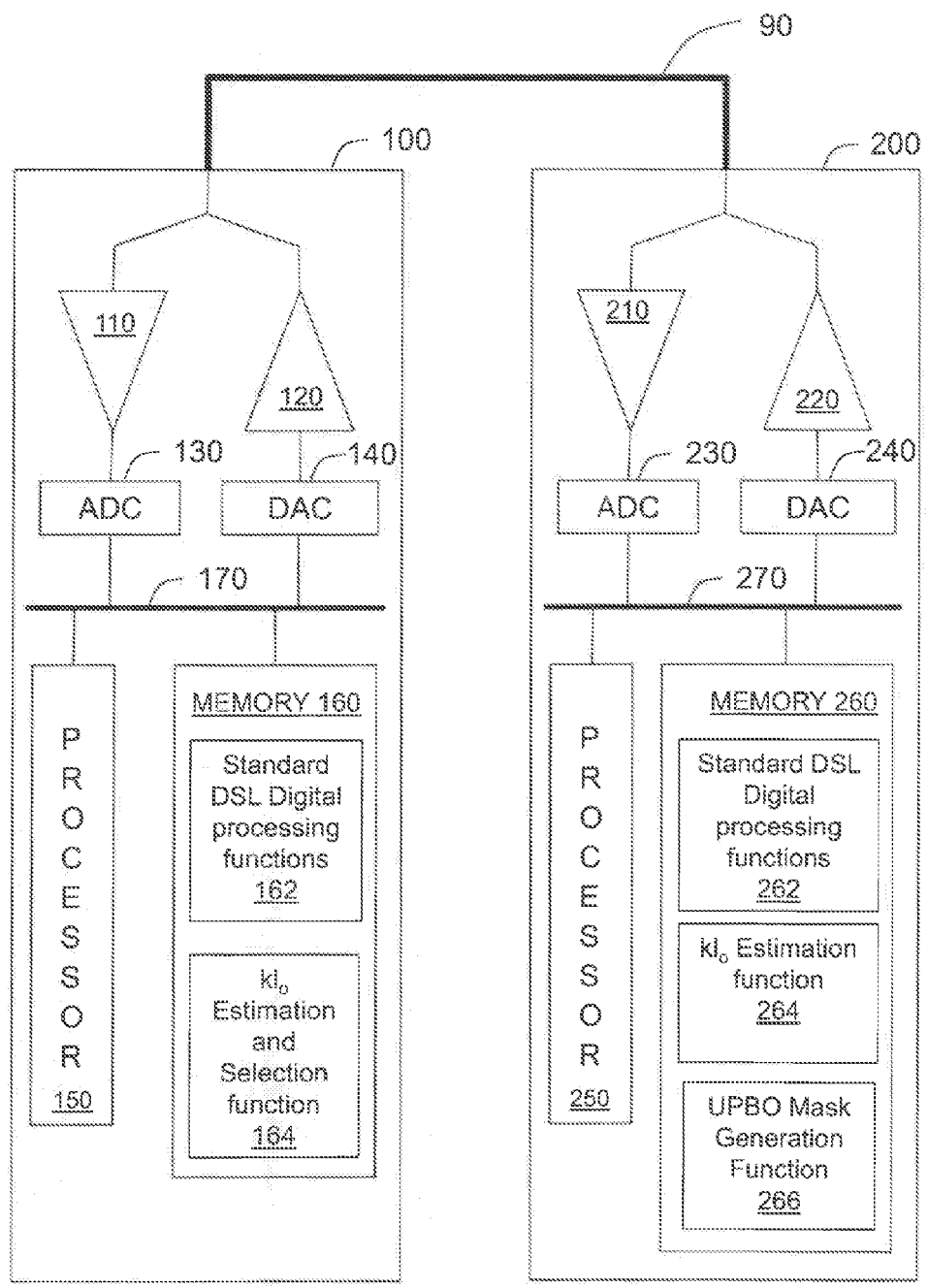
FIG. 1 is a schematic block diagram illustrating a digital subscriber line arrangement comprising a customer premises side modem, a network side modem and a copper pair connection between the two according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF EMBODIMENTS

According to an embodiment, a DSL modem is arranged to measure the attenuation of signals (or some measure associated therewith) at a plurality of different frequencies and to combine these measurements together to form a combined attenuation measure and to use this combined measure to form an electrical length estimation, and then to use the electrical length estimation thus formed to generate an upstream power back off mask for use in controlling the amount of power used when transmitting signals upstream over a copper pair connection to which the modem is connected in one or more upstream transmission bands.

In one embodiment, both DSL modems attached to a particular DSL line (the customer premises side modem and the network side modem) perform an estimation of the electrical length of the line and the smaller estimation is used by the customer premises side modem to generate the upstream power back off mask.

In one embodiment, the attenuation measurements are combined by obtaining a predetermined percentile attenuation measurement (e.g. the fifth percentile value, but preferably a percentile value between 5 and 20%) or a predetermined percentile value of an associated measurement (e.g. of the transfer function of the line or some form thereof), or a predetermined percentile value of an expression which includes this measurement (e.g. the ratio of the attenuation to the frequency of the signal at which the attenuation is measured raised to some exponent, where that exponent is approximately one half in an embodiment, or somewhere between one half and unity in embodiments), and using this value as the combined measure.

In the present document, the term "combined" is generally used to mean an approach in which at least two or more values must be either combined in some way (i.e. by adding them together and dividing by the total number of measurements to generate a mean average or some value a certain number of standard deviations removed from the mean, etc.) or some percentile value (other than a zeroth or one hundredth percentile) is calculated (which can be thought of as finding a combined value a certain statistical distance from the median average). Obtaining a simple minimum or maximum is not generally considered in the present application to amount to a combination since all that is required is to find the single smallest or largest number in a set of numbers and it is pretty much therefore independent of all of the other numbers in the set. By contrast, taking a non minimum or maximum number is more akin to a type of averaging (c.f. the median average) which depends upon a considerable number of other numbers which must practically be therefore at least simultaneously stored in memory for some sort of relative comparison to take place in order to generate a combined value. Thus it includes calculating a percentile value (other than a zeroth or hundredth percentile value as discussed below) a possible rationale for making such a distinction is that calculating a percentile value normally requires storing a fairly large number of values to be "combined" at least by a kind of relative ordering or relative comparison of some sort, however, the simpler procedure of determining simply the minimum (or maximum) value in a set of values, merely requires that a single test value is kept and sequentially compared with each subsequent measurement and the test value be reassigned to the current measurement value if it is less than the test value (or more than the test value when seeking the maximum), but otherwise to simply discard the current measurement value and check the unchanged test value against the next measurement value, etc.

Figure 9:
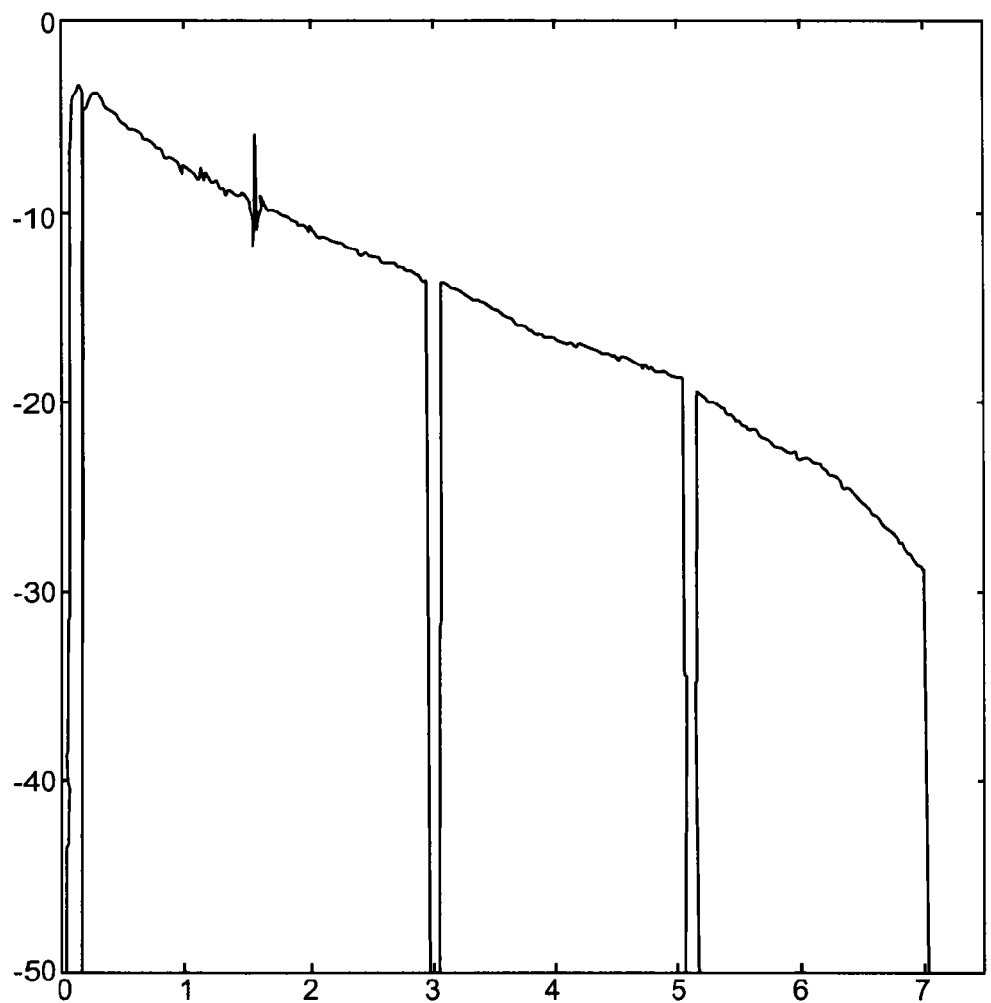
Figure 10:
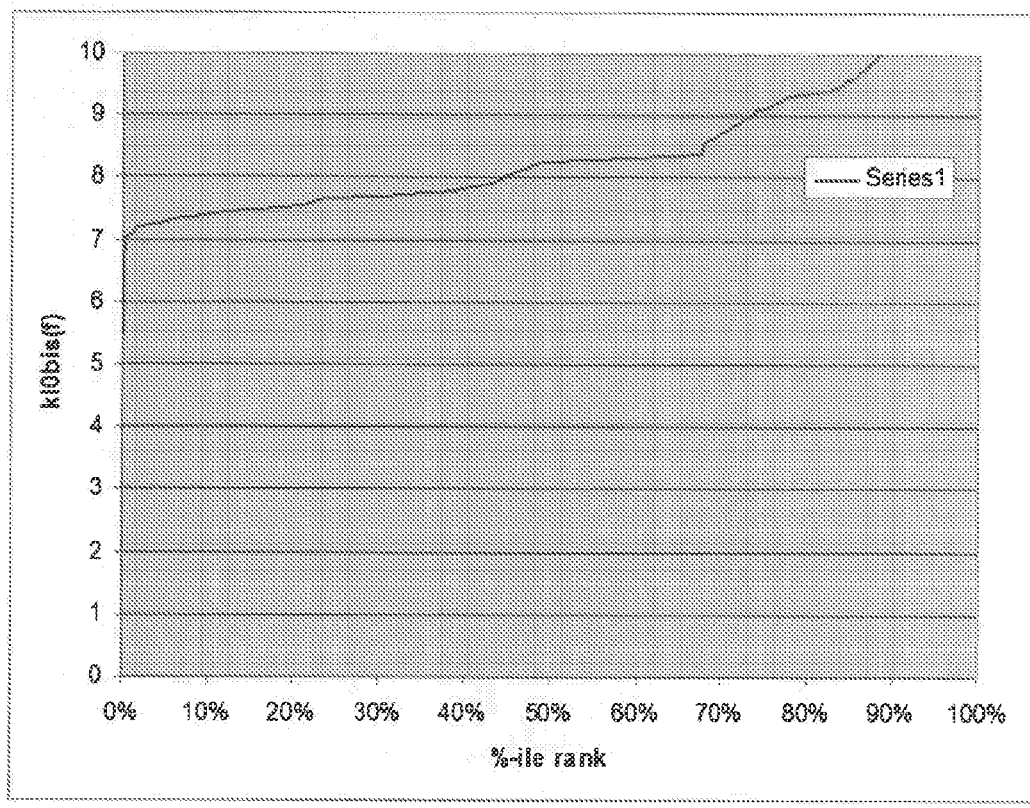
FIG. 10 is a percentile graph illustrating the data represented in FIG. 9 reexpressed as a percentile graph such that the HLOG data is re-organised into ascending order of HLOG values regardless of frequency.
Figure 11:
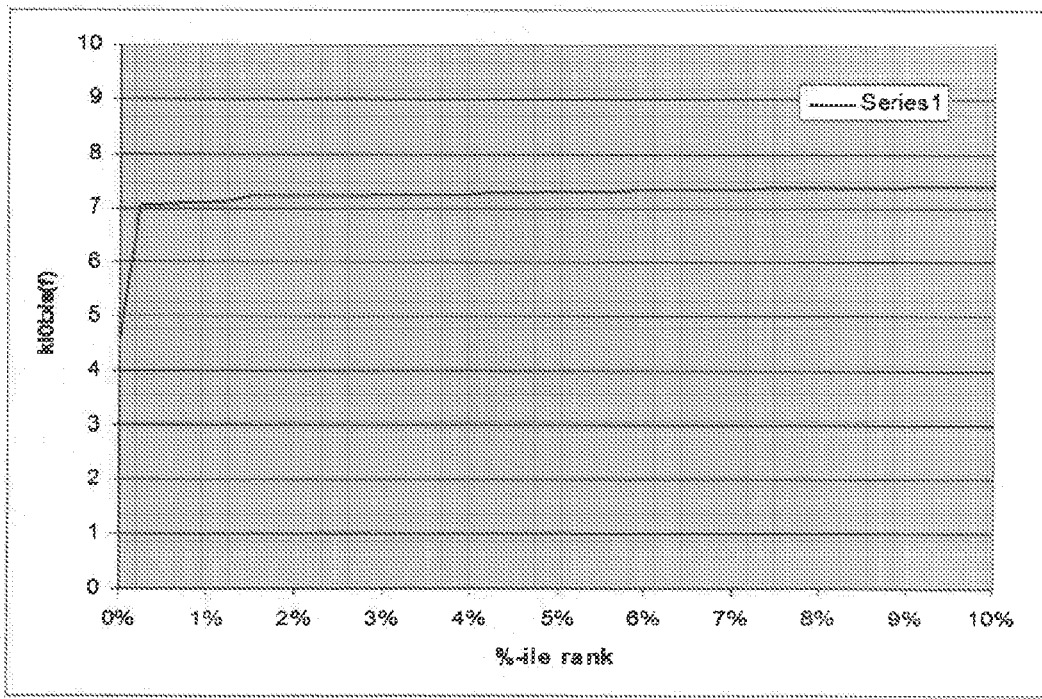
FIG. 11 is a percentile graph similar to FIG. 9 but only showing the first 10% of the data at a correspondingly expanded scale.

By combining a plurality of measurements (e.g. by determining a non-zeroth percentile or by forming an average or a value at a predetermined number of standard deviations from the mean, etc.), anomalous effects causing disruptions to the signals at just one or a few frequencies will not result in a spurious estimation of electrical length which significantly overestimates (or indeed underestimates) the electrical length of the line in question. This in turn helps to reduce "short" lines from transmitting signals with too much power resulting in FEXT issues for other longer lines in the same binder. In particular, by using a predetermined percentile value, the effect of narrow band radio broadcast signals interfering with the DSL signals can be mitigated. As shown in FIGS. 9, 10 and 11 such broadcasts (e.g. from a local broadcast radio station transmitter) can cause a spike in the HLOG (note that HLOG is approximately equal to minus the insertion loss when both are expressed in decibels). This is caused by the extra noise from the broadcast being detected as additional received power at those frequencies thus appearing as a reduction in attenuation (if the additional power attributable to the noise is not distinguished from the power attributable to the signal carried over the DSL from the remote modem, as is normally the case). This apparent drop in attenuation tends to give rise to an underestimate of the electrical length if a simple minimum value of loss over root f is used (provided the loss is actually measured at one of the frequencies effected by the local radio broadcast).

In embodiments, the estimate of electrical length additionally takes into account a fixed error (expressed as a value in decibels) which can occur in the measurement of attenuation. In some embodiments this error can be assigned a value of between 1 and 2 decibels, for example a value of approximately 1.5 decibels. This can correct any fixed errors which the inventors have determined are often present in the estimation of attenuation by DSL modems operating in real environments.

In embodiments, the estimate of electrical length can involve combining together a plurality of values each of which is obtained from a measurement of HLOG (or the insertion loss) divided by the frequency at which HLOG or the insertion loss was measured raised to an exponent between ½ (i.e. square root) and unity. This can be done by dividing by $a*\sqrt{f}+bf$ where a and b are parameters which are chosen to take a value in the interval between [0,1] and chosen to sum to unity. This provides a better model of the way in which HLOG (or insertion loss) varies with frequency in a line which is not affected by issues such as bridged taps and external narrow band interferences etc., for some types of lines.

According to an embodiment, a digital subscriber line arrangement comprises a customer premises side modem, a network side modem and a copper pair connection between the modems, wherein each modem is arranged to measure the attenuation of signals transmitted by the other modem (or some measure associated therewith) at a plurality of different frequencies and to combine these measurements together to form a combined attenuation measure and to use this combined measure to form an electrical length estimation, and wherein the customer premises modem is operable to use one or other or both of the electrical length estimations thus formed to generate an upstream power back off mask for use in controlling the amount of power used when transmitting signals over the copper pair connection to the network side modem in one or more upstream transmission bands.

In an embodiment, a digital subscriber line (DSL) arrangement comprises a downstream modem; an upstream modem; and a copper pair connection between the downstream and upstream modems, wherein each modem is arranged to obtain a measurement related to an attenuation of signals transmitted by the other modem at a plurality of different frequencies and to combine the measurements together to form a combined attenuation measure and to use the combined attenuation measure to form an electrical length estimation, wherein the downstream modem is operable to transmit an electrical length estimation to the upstream modem, wherein the upstream modem is operable to generate a definitive electrical length estimation in dependence upon both the electrical length estimation received from the downstream modem and the electrical length estimation made by the upstream modem and to transmit the definitive electrical length estimation to the downstream modem, and wherein the downstream modem is operable to use the definitive electrical length estimation received from the upstream modem to generate an upstream power back off mask for use in controlling an amount of power used when transmitting upstream signals over the copper pair connection to the upstream modem in one or more upstream transmission bands. The measurement related to an attenuation of signals transmitted by the other modem can comprise a measurement of a function of an attenuation of signals transmitted by the other modem such as the negation of the difference between the HLOG parameter (as determined by the modem in the normal manner) and a small error correction, all divided by the frequency at which HLOG was measured raised to an exponent between ½ (i.e. square root) and unity. In such an embodiment, the combined attenuation measure can be expressed by the following formula:

$$\text{Combined\_Attenuation\_Measure} = x^{th} \text{ percentile}\left(\frac{-(H\log(f) - Ei))}{a \cdot \text{root}(f) + b \cdot f}\right)$$

where a can take any value from one to zero; b is the difference between one and a (such that a+b=1); and Ei can take the value zero or any positive integer greater than zero. Note that, as will be well known to persons skilled in the art, H log is a vector which is calculated by a DSL modem during the training sequence and is available whenever a VDSL2 link has reached the SHOWTIME state (i.e. has successfully trained up). It is calculated across the entire range of frequencies which can possibly be used for data transmission, but the grid of frequencies is typically more coarse than the grid of carriers used for data transmission. As an example, on the HUAWEI platform, the H log frequency grid is currently 4 times more coarse than the carrier spacing.

Note that workers in the field of Digital Subscriber Lines may use alternative terminology to that used above. In particular in the VDSL2 field workers may refer to modems as either Vdsl Transceiver Unit-Central Office end (VTU-O) modems (the head end modem) or VTU-C (where C=Customer) (the Customer premises modem). These correspond to the upstream and downstream modems, respectively, according to the terminology used herein.

According to an embodiment, a method of operating a digital subscriber line modem comprises measuring at the modem the attenuation of signals received by the modem (or some measure associated therewith) at a plurality of different frequencies and combining these measurements together to form a combined attenuation measure and using this combined measure to form an electrical length estimation, and then the modem using the electrical length estimation thus formed to generate an upstream power back off mask for use in controlling the amount of power used when transmitting signals upstream over a copper pair connection to which the modem is connected in one or more upstream transmission bands.

According to an embodiment, a method of operating a digital subscriber line arrangement comprises a customer premises side modem, a network side modem and a copper pair connection between the modems, wherein at least one of the modems measures the attenuation of signals transmitted by the other modem (or some measure associated therewith) at a plurality of different frequencies and combines these measurements together to form a combined attenuation measure and uses this combined measure to form an electrical length estimation, and wherein the customer premises modem uses the electrical length estimation, or one or other or both of the electrical length estimations when both modems generate an estimation in this way, to generate an upstream power back off mask and controls the amount of power used when transmitting signals over the copper pair connection to the network side modem in one or more upstream transmission bands in accordance with the generated upstream power back off mask.

Additional embodiments include processor implementable instructions for causing a processor controlled device to carry out embodiments of the aforementioned methods and carrier means, for example tangible carrier means such as a magnetic or optical storage disc (e.g. a hard drive platter, or a CD or DVD) or a solid state storage device (e.g. a USB minidrive, etc.), carrying such processor implementable instructions.

Generally, in access network terminology, there is considered to be a downstream and an upstream direction, with Customer Premises Equipment being at the most downstream point. DSL modems are sometimes therefore referred to as being either upstream or downstream modems where the downstream modem is the Customer premises side or CPE modem and the upstream modem is the network side or CO modem.

Referring to FIG. 1, an embodiment is illustrated in overview as comprising a first CO modem 100 (CO stands for Central Office and is used to indicate a network side modem), a second CPE modem 200 (CPE stands for Customer Premises Equipment and is used to indicate a customer premises side modem) and a copper pair connection 90 which interconnects the two DSL modems 100, 200. The CO modem may well be incorporated within a Digital Subscriber Line Access Multiplexer (DSLAM) or some other aggregation device (e.g. a Multiple Services Access Node (MSAN)) comprises a number of network side DSL modems. The CPE modem on the other hand may well be incorporated in some form of home networking device (e.g. BRITISH TELECOMMUNICATIONS'S "Home Hub").

CO modem 100 includes some standard analogue circuitry illustrated by a signal amplifier 110 for amplifying signals received over the connection 90 and a line driver 120 for transmitting signals onto the connection 90. CO modem 100 additionally includes an Analogue to Digital Converter (ADC) 130 for converting received and amplified signals into the digital domain and a Digital to Analogue Converter (DAC) 140 for converting digital signals into analogue signals for transmission over the connection 90.

Within the digital domain, the CO modem 100 includes standard digital hardware for performing the standard necessary digital functionality for implementing a DSL modem represented here with a processor unit 150, a memory 160 and a system bus 170, where the memory stores various code modules responsible for carrying out the relevant digital functions—these are illustrated as a set of standard functions 162 which are not discussed in detail here simply because they are not pertinent to embodiments of the invention and operate in the conventional manner understood by one having ordinary skill in the art, and a $kl_0$ estimation and selection function code means 164.

The $kl_0$ estimation and selection function code means 164 is operable to cause the CO modem 100 to both perform an estimation of the electrical length $kl_0$ (based on a measurement of HLOG in a manner discussed in greater detail below) as well as to select which estimation to use between a choice of either the estimation determined by the CO modem and the estimation performed by the CPE modem—in one embodiment, this is done simply by selecting the shorter electrical length distance (where electrical length, $kl_0$, is measured in dBs with the greater the length, the greater the positive dB value, then the shortest length is the smaller of the two $kl_0$ values). However, it would be possible to use more sophisticated methods such as using the smaller value unless it is the CPE estimate and it more than some threshold amount lower than that estimated by the CO modem and may therefore be simply wrong (e.g. because of a poor implementation of $kl_0$ estimation within the CPE modem, etc.) in which case the CO modem estimate would be used instead.

The CPE modem 200 is similar to the CO modem 100 in that it contains some standard analogue circuitry illustrated by a signal amplifier 210 for amplifying signals received over the connection 90 and a line driver 220 for transmitting signals onto the connection 90. CPE modem 200 additionally includes an Analogue to Digital Converter (ADC) 230 for converting received and amplified signals into the digital domain and a Digital to Analogue Converter (DAC) 240 for converting digital signals into analogue signals for amplification and transmission over the connection 90.

Within the digital domain, the CPE modem 200, similar to the CO modem, includes standard digital hardware for performing the standard necessary digital functionality for implementing a DSL modem represented here with a processor unit 250, a memory 260 and a system bus 270, where the memory stores various code modules responsible for carrying out the relevant standard digital functions illustrated as a set of standard functions 262. In addition, and dissimilarly to the CO modem, the CPE modem is additionally illustrated as including a $kl_0$ estimation function code means 264 which operates to perform a $kl_0$ estimation in a similar manner to that of the $kl_0$ estimation and selection function of the CO modem 100 (but without needing to perform the selection function) and additionally it is illustrated as including an Upstream Power Back Off (UPBO) mask generation function code means 266. This, in fact, is largely standard in its operation for a VDSL2 modem (i.e. one conforming to the G.993.2 standard), except that according to G993.2, there is no stipulation as to which value of the $kl_0$ estimation should be used (i.e. whether the one generated by the CO modem, or the one generated by the CPE modem) whereas in one embodiment, the UPBO mask generation function generates the mask based on the $kl_0$ estimation provided by the CO modem 100. This is important because in the present embodiment the CO modem includes a $kl_0$ estimation selection function which enables an intelligent choice to be made about which $kl_0$ estimation should be used. Of course in alternative embodiments the selection functionality could be implemented in the CPE modem 200 instead of or as well as in the CO modem in which case the $kl_0$ estimation which the UPBO mask generation should be based on could obviously be a $kl_0$ estimation ascertained by a $kl_0$ estimation selection process done by either the CO modem or the CPE modem.

Figure 2:
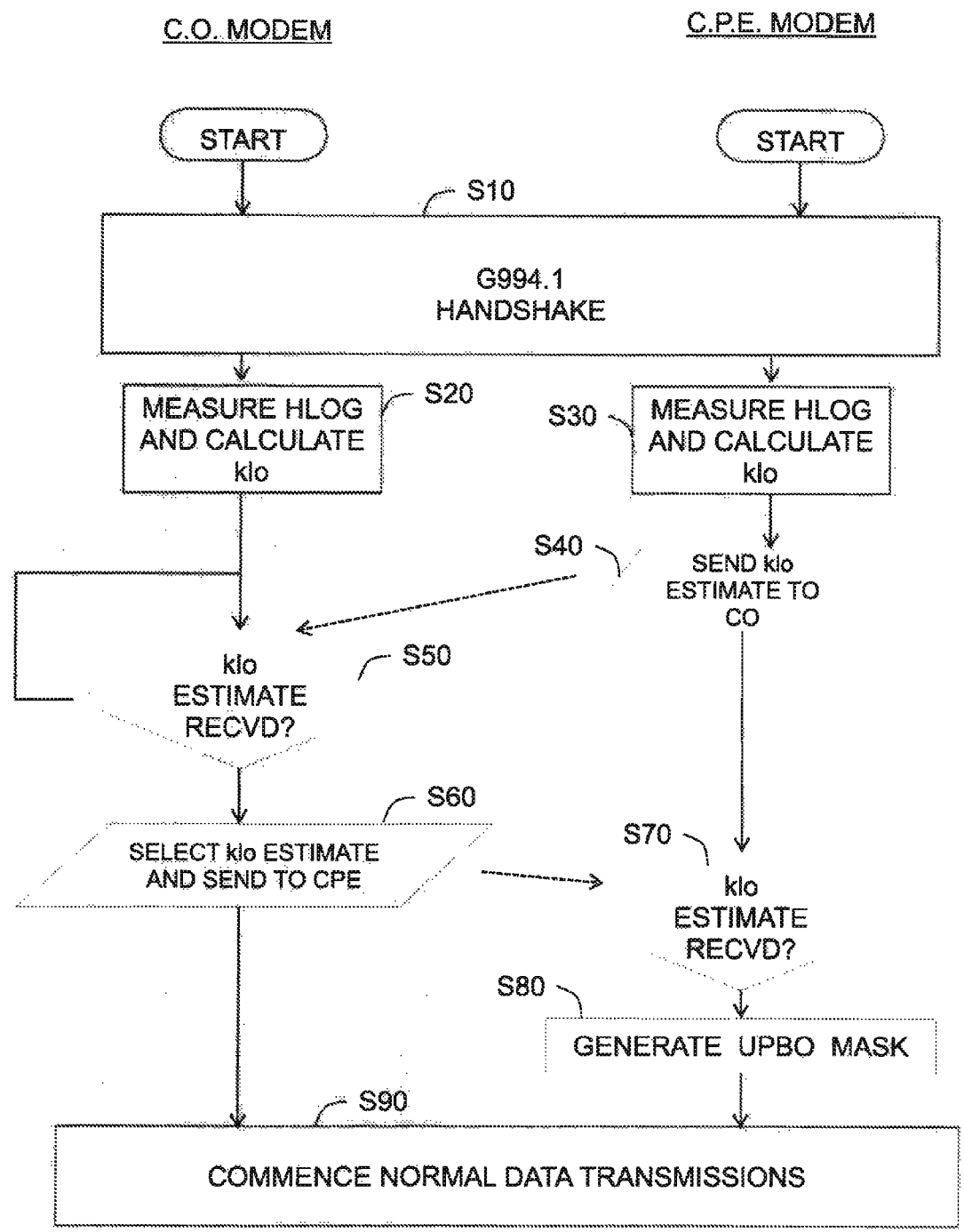
FIG. 2 is a flow chart illustrating a method performed by the modems of FIG. 1 to control the upstream power used to transmit signals from the customer premises side modem to the network side modem according to an embodiment.

Referring now to FIG. 2, actions carried out by the modems (focusing just on those which are non-standard and pertinent to embodiments of the invention) according to one embodiment will now be described. Thus, both modems commence operation by performing the initial standard DSL handshake at S10. This is specified in ITU standard G.994. Once this initial handshake procedure is completed, the modems are both in a position to perform $kl_0$ estimations and they do this at S20 and S30 respectively. Then, at S40, the CPE modem sends its $kl_0$ estimation to the CO modem. Once the CO modem determines at S50 that it has received the CPE's $kl_0$ estimation, at S60 it selects either the just received CPE $kl_0$ estimation or its own $kl_0$ estimation—in one embodiment, this is done simply by selecting the shorter (i.e. the smallest value when expressed in positive dB's) of the two estimations and then sends the selected $kl_0$ estimation to the CPE modem. When the CPE modem determines at S70 that it has received the $kl_0$ estimation sent by the CO modem, it then proceeds to S80 where it generates a UPBO mask using the $kl_0$ estimation just received from the CO modem. Once the UPBO mask has been generated at S80 (and any further handshake type actions which are standard and not pertinent to embodiments) then both modems proceed to a normal state in which they can commence making normal data transmissions, as indicated by the "commence normal data transmission" at S90.

FIGS. 3-8 illustrate a selection of HLOG plots from a live VDSL deployment in the UK. These figures illustrate how the real network deviates from ideal behavior even when deployment practice includes an engineering visit to fit the customer premises equipment including a service splitter.

Figure 3:
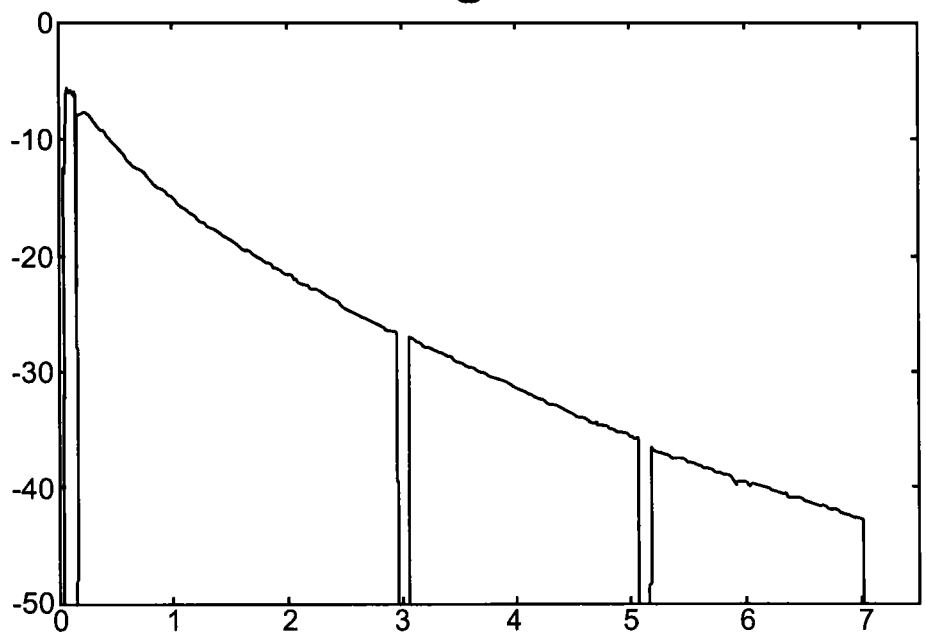
FIGS. 3 to 9 are graphs illustrating plots of HLOG versus frequency for various different DSL arrangements, illustrating in particular the effects of bridged taps and external sources of radio noise, etc., according to embodiments.
Figure 4:
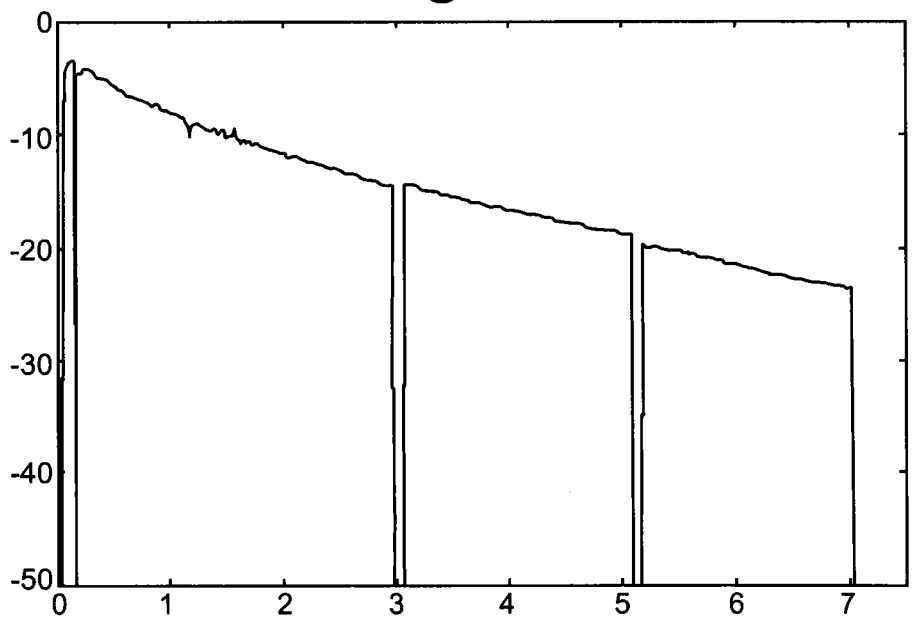

FIGS. 3 and 4 illustrate HLOG plots of lines which are in good condition. It can be seen that in these Figures there is only a modest difference between upstream and downstream measurement of loop loss in each case (note that the upstream portions are between 0.024 MHz-0.138 MHz and again from 3.0 MHz-5.1 MHz, whilst the downstream portions are from 0.138 MHz-3.0 MHz and from 5.1 MHz-7.05 MHz).

Figure 5:
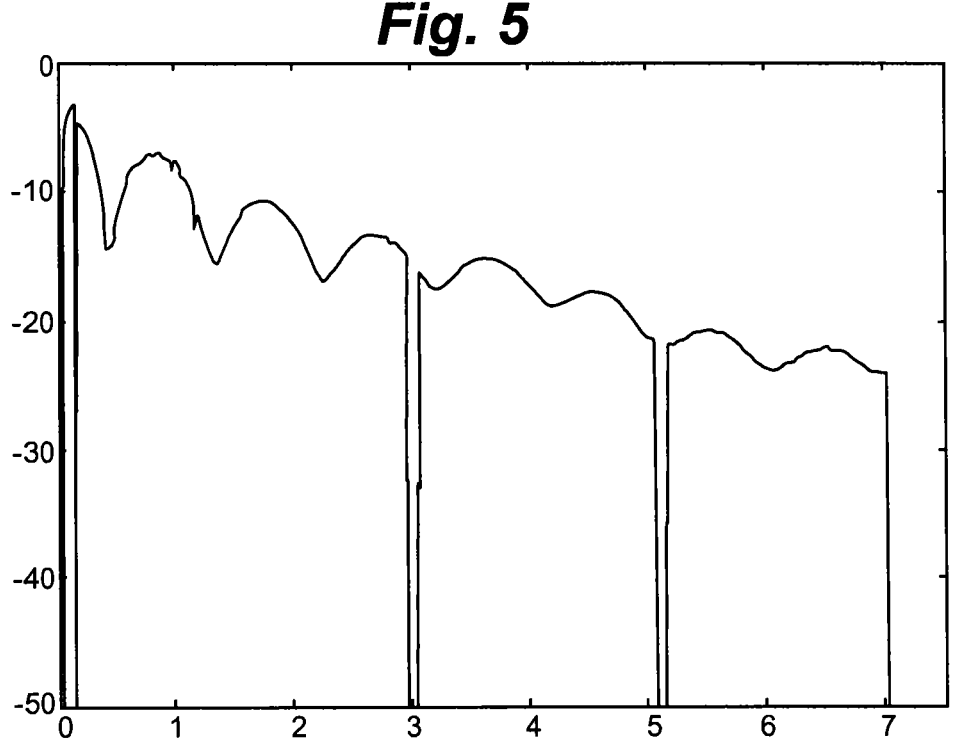
Figure 6:
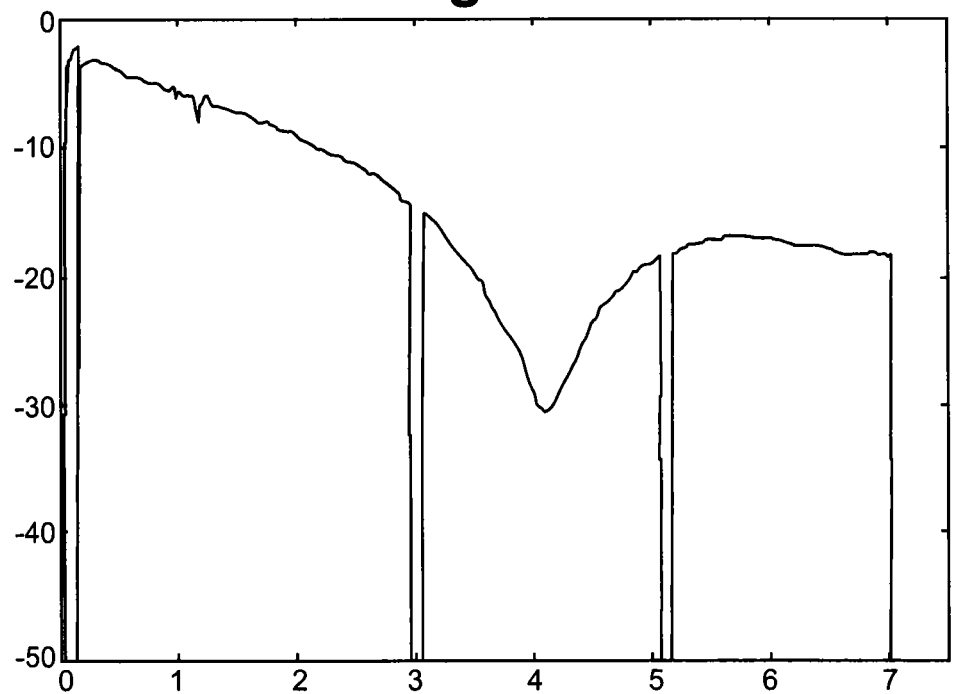

FIGS. 5 and 6 illustrate HLOG plots of lines which have Bridge taps with lengths which can be estimated very roughly as being 100 m and 12 m long respectively. It is unlikely that conditions such as these would be investigated and repaired, as DSL service and POTS service are both likely to be satisfactory.

Figure 7:
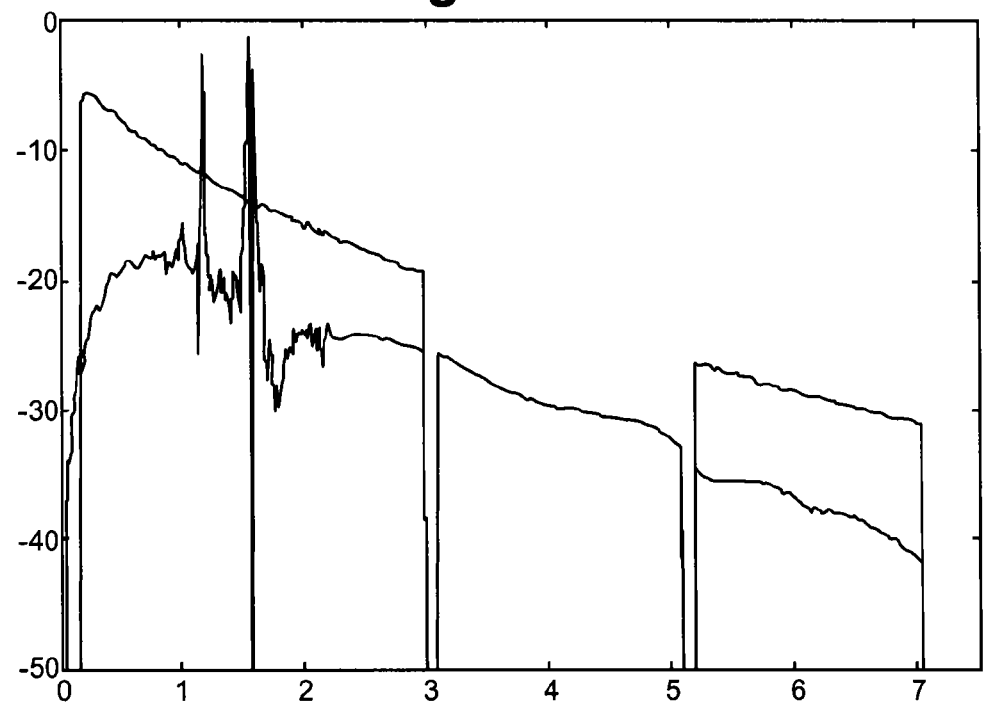
Figure 8:
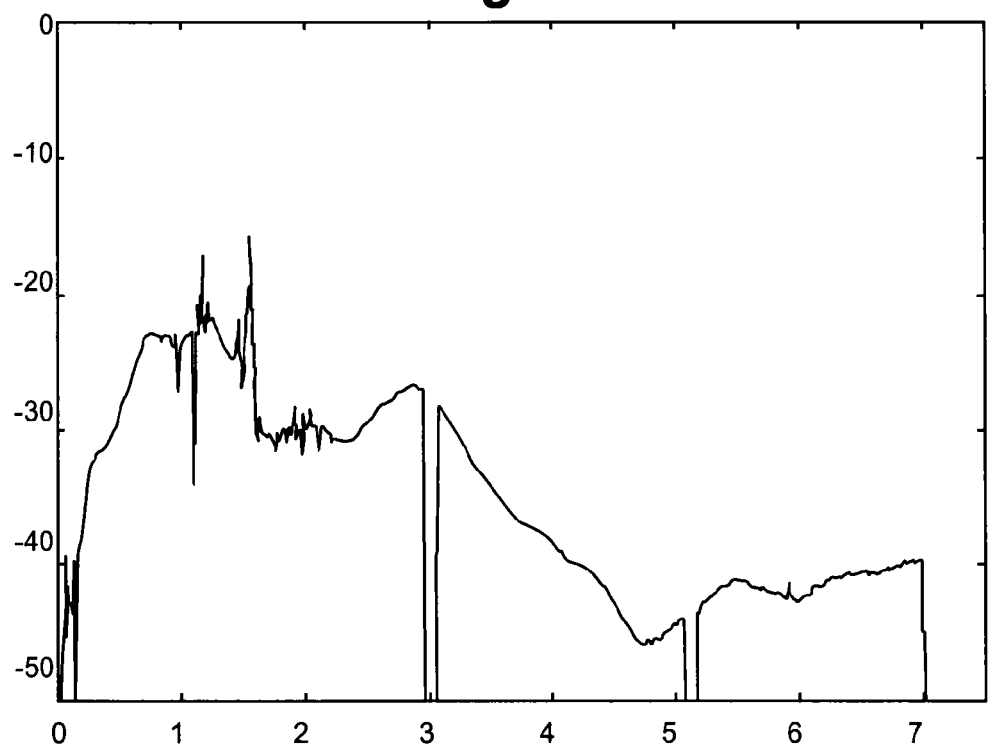

FIG. 7 illustrates an HLOG plot that has been taken from a line with a time varying fault, including two measurements taken 6 hours apart. Judging by the high loss at low frequencies, the second line has a bad HR or a "one-leg-disconnected" fault. Fault conditions as extreme as these will be causing poor quality of service for both DSL and POTS, and on receipt of a customer fault report, it is to be expected that the conditions would normally be investigated and resolved. Similarly, FIG. 8 illustrates an HLOG plot suffering severe metallic faults in the line, possibly including a bridge tap and some external noise in the 1-1.5 MHz range.

As determined by experimental trials, substantial differences have been noted between the $kl_0$ estimates reported by modems (hereinafter also referred to as VTU equipment) from different manufacturers (hereinafter also referred to as vendors), when presented with copper pair connections which deviate from the ideal.

In order to improve the experience for the end user and to maintain the economic case for deploying VDSL2, embodiments of the present invention seek to ensure that the impact of network imperfections is minimised.

In particular, if the electrical length is over-estimated, as could easily be the case if a spot frequency measurement of H log(f) (also herein—as well as in the relevant standards applicable to VDSL2—referred to as HLOG) was used to deduce $kl_0$ on the line depicted in FIG. 6, it could result in significantly too much power being launched to line. In turn, this could cause loss of service to another end user, through excessive crosstalk (in particular FEXT) to that user's circuit in the same cable binder.

In order to reduce the likelihood of this adverse outcome, in embodiments:

A new method of estimating the electrical length $kl_0$ is used—hereinafter, electrical length measured in this way is referred to as k10bis The calculation of k10bis is performed independently in each transmission band, both upstream and downstream The algorithm used to determine k10bis for a given band is as specified below The algorithm used to combine the per-band k10bis values is also as specified below. In variations of the embodiment, a control variable may be used to select one of a number of possible algorithms for combining the electrical length estimations as discussed above.

In the some networks (in particular the BRITISH TELECOMMUNICATIONS network in the UK), a simple root(f) (i.e. square root of f) cable model works quite well. However, calibration errors $E_i$ in calculation of H log(f) on some circuits have been noticed—these may show up as an offset between upstream and downstream regions of the H log(f) trace. For a given CO modem/CPE modem (VTU-ONTU-C) combination, such offsets lead to a better model for H log(f) being $$H \log(f) = Ei - kl_0 * \text{root}(f)$$

Furthermore, the cables in some networks, do not follow a root(f) model quite so well. In certain embodiments, for these cables, a power law model for the cable, such as $$H \log(f) = Ei - kl_0 \text{bis} * [a \cdot \text{root}(f) + b \cdot f]$$

can be used. If a and b are chosen such that they sum to 1, Kl0bis will once more be the loss of the cable at 1 MHz, after compensating for the calibration error on that particular circuit.

It remains to be identified how best to determine what the correct absolute value for Ei should be for a given VTU-ONTU-R combination. In the absence of any better algorithm for estimating Ei embodiments include an element in the Management Information Base (MIB) of a network operator associated with a DSLAM or DSLAMs allowing a network operator to provide an offset which will protect against regulatory violation as a result of overestimating the loop length due to this unknown calibration error. For example, an operator could choose Ei to be −1.5 dB, KL0bis would then be underestimated by 1.5 dB at 1 MHz by perfect hardware.

Given the above comments, one embodiment therefore uses the following procedure for calculating an estimation of electrical length KL0bis:

In each band, KL0bis is estimated conservatively thus:

$$KL0bis = x^{th} \text{ percentile}\left(\frac{(-(H\log(f) - Ei))}{a \cdot \text{root}(f) + b \cdot f}\right)$$

In this case, the function of which a percentile value is being taken is evaluated using the values of HLOG and f appropriate to the transmission band (e.g. in a typical VDSL2 deployment there is an UpStream 0 (US0) band from 24 KHz to 138 KHz; a DownStream 1 (DS1) band from 138 KHz to 3.0 MHz; an UpStream 1 (US1) band from 3.0 MHz to 5.1 MHz and a DownStream 2 (DS2) band from 5.1 to 7.05 MHz) for which Kl0bis is being calculated. The value of x which is used in the present example is 5 (i.e. we take the $5^{th}$ percentile) for reasons discussed below, however different values can clearly be used to cater for the exact network conditions and type of DSL being used, etc. A value of the function is evaluated using the values of HLOG and f of the central frequency of each tone for which a measurement of HLOG (as defined in G.993.2 and G.997.1) can be made by the system.

Using such an algorithm reduces the tendency, which has been observed in commercially available DSLAMs, for loop length to be over-estimated when a bridged tap is present.

A percentile is used because if simply the minimum value of the function were taken it would be prone to error in cases where there are isolated anomalous low (Magnitude) values in the HLOG data (i.e. less negative values since HLOG gives a negative value in decibels), such as is the case on the HLOG data set shown in FIG. 9, where a strong local AM broadcast signal has resulted in an anomalous HLOG behaviour around 1.5 MHz. By chance, this line also appears to have a short bridged tap, causing the increasing slope in the DS2 band towards a presumed null in H log(f) at around 8 MHz.

However, the procedure of this embodiment is substantially protected against such anomalous values by sorting the KL0bis values calculated at the individual (tone center) frequencies present in the data set and then taking the $x^{th}$ percentile value (e.g. the 5%-ile value) because the function $$\frac{(-(H\log(f) - Ei))}{a \cdot \text{root}(f) + b \cdot f}$$

is a slowly changing function of frequency for the most part, as shown in FIG. 10.

FIGS. 10 and 11 show the individual $$\frac{(-(H\log(f) - Ei))}{a \cdot \text{root}(f) + b \cdot f}$$

values, with, in this example, Ei and b being zero and a being unity such that the function simplifies to: −H log(f)/root(f). However, these values computed from the H log data set have been ranked into ascending order, with rank rated from 0 (lowest −H log(f)/root(f) value) to 1 (highest). The 5%-ile kl0bis value is about 7.2 dB for this data set. The plot of FIG. 11 zooms in on the first 10% of the values in the plot of FIG. 10. It can be seen that the −H log(f)/root(f) value barely changes between the 5% and 10%-ile values, with less than 0.5 dB variation between the 5%-ile and the 20%-ile. Thus any percentile value from the $5^{th}$ to the $20^{th}$ would be acceptable in the present case. The presence of the bridged tap has resulted in the significantly higher values of −H log(f)/root(f) above the 50%-ile—such values would give rise to a poor estimate of electrical length if they had been used.

Having computed the per-band KL0bis values, it has also been appreciated that it is beneficial to define how they are combined to form a single KL0bis value for use in generating a UPBO mask (and which might additionally be useful for line qualification purposes, for example).

There are a number of possibilities in which the per-band values could advantageously be combined. Two possibilities considered to be particularly advantageous in embodiments are:

Always use the KL0bis value computed in the DS1 band (the rationale being that DS1 tends to be least affected by bridged taps and is in any case, the band where the lowest ratio is to be found on a well behaved circuit)

Always use the minimum of the full set of computed per band KL0bis values (the rationale for this choice being that using such a KL0bis value will give the best behaviour in the presence of extreme copper network conditions).

Clearly, it can also be possible to use a combination of the above strategies—e.g. always use the DS1 band KL0bis value unless the other values are widely divergent (e.g. differing by more than 20%—or more than 50%, etc.) from those of the other bands, in which case use the second strategy of choosing the minimum value, etc.

Finally, it should be noted that in one embodiment the telecom network operator who administers the CO modem is given options to control the following:
control of which UPBO method to use;
to be able to observe per band KL0bis values;
to be able to override per band KL0bis values; and
control of how KL0bis values are combined to form the single overall KL0bis value used for UPBO mask generation or line qualification.

In one embodiment, this is done by specifying new MIB elements and new messages between the Operation and Support System of the network operator and the MIB, and between the MIB and the CO modem to give this level of control and visibility to the network operator.

Note that where different modems (i.e. as between the CO modem and the CPE modem) are responsible for calculating KL0bis across different bands (e.g. if the CO modem calculates KL0bis for US0 and US1 whilst the CPE modem calculates KL0bis across DS1 and DS2) then the operator additionally has the option to specify that the values calculated by the CO modem are perhaps to be preferred in some cases since generally the network operator may have more confidence in the correct operation of the CO modem than of the CPE modem.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc., may have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A modem comprising:
   circuitry arranged to obtain measurements of attenuation of signals at a plurality of different frequencies, to combine the measurements together to form a combined attenuation measure and to use the combined attenuation measure to form an electrical length estimation, and then to use the electrical length estimation to generate an upstream power back of mask for use in controlling an amount of power used when transmitting signals upstream over a copper pair connection to which the modem is connected in one or more upstream transmission bands,
   wherein the combined attenuation measure is formed by generating a plurality of values associated with different frequencies and selecting one value of the plurality of values as the combined attenuation measure according to relative magnitudes of the plurality of values such that the selected value corresponds to a predetermined non-zeroth and non-hundredth percentile of the plurality of values, wherein the selection is made by finding a percentile value.

2. A modem according to claim 1, wherein the percentile value is in a range of the $5^{th}$ to the $20^{th}$ percentile of the measurements.

3. A modem comprising:
   circuitry arranged to obtain measurements of attenuation of signals at a plurality of different frequencies, to combine the measurements together to form a combined attenuation measure and to use the combined attenuation measure to form an electrical length estimation, and then to transmit the electrical length estimation to a downstream connected modem, whereby the downstream connected modem is configured to use the transmitted electrical length estimation to generate an upstream power back off mask for use in controlling an amount of power used when transmitting signals upstream over a copper pair connection to which the modem is connected in one or more upstream transmission bands,
   wherein the combined attenuation measure is formed by generating a plurality of values associated with different frequencies and selecting one of the plurality of values as the combined attenuation measure according to relative magnitudes of the plurality of values such that the selected value corresponds to a predetermined non-zeroth and non-hundredth percentile of the plurality of values, wherein the selection is made by finding a percentile value.

4. A modem according to claim 3, wherein the percentile value is in a range of the $5^{th}$ to the $20^{th}$ percentile of the measurements.

5. A digital subscriber line (DSL) arrangement comprising:
   a downstream modem;
   an upstream modem; and
   a copper pair connection between the downstream and upstream modems,
   wherein each modem is arranged to obtain a measurement related to an attenuation of signals transmitted by the other modem at a plurality of different frequencies and to combine the measurements together to form a combined attenuation measure and to use the combined attenuation measure to form an electrical length estimation,
   wherein the downstream modem is operable to transmit an electrical length estimation to the upstream modem,
   wherein the upstream modem is operable to generate a definitive electrical length estimation in dependence upon both the electrical length estimation received from the downstream modem and the electrical length estimation made by the upstream modem and to transmit the definitive electrical length estimation to the downstream modem,
   and wherein the downstream modem is operable to use the definitive electrical length estimation received from the upstream modem to generate an upstream power back off mask for use in controlling an amount of power used when transmitting upstream signals over the copper pair connection to the upstream modem in one or more upstream transmission bands.

6. A DSL arrangement according to claim 5, wherein the combined attenuation measures are formed by generating a plurality of values associated with different frequencies and selecting one of the plurality of values as the combined attenuation measure according to relative magnitudes of the plurality of values such that the selected value corresponds to a predetermined non-zeroth and non-hundredth percentile of the plurality of values, wherein the selection is made by finding a percentile value.

7. A DSL arrangement according to claim 6, wherein the percentile value is in a range of the $5^{th}$ to the $20^{th}$ percentile of the plurality of values.

8. A DSL arrangement according to claim 5, wherein the measurement related to an attenuation of signals transmitted by the other modem comprises a measurement of an attenuation of signals transmitted by the other modem.

9. A DSL arrangement according to claim 5, wherein the measurement related to an attenuation of signals transmitted by the other modem comprises a measurement of a function of an attenuation of signals transmitted by the other modem.

10. A method of operating a digital subscriber line (DSL) arrangement comprising a downstream modem, an upstream modem and a copper pair connection between the modems, the method comprising:

obtaining, by at least one of the downstream or upstream modems, at least one measurement related to an attenuation of signals transmitted by the other of the downstream or upstream modems at a plurality of different frequencies, combining the at least one measurement together to form a combined attenuation parameter and using the combined attenuation parameter to form an electrical length estimation; and using, by the downstream modem, one of the electrical length estimation or a definitive electrical length estimation generated in dependence upon electrical length estimations generated when both the downstream and upstream modems form electrical length estimations to generate an upstream power back off mask and controlling an amount of power used when transmitting signals over the copper pair connection to the upstream modem in one or more upstream transmission bands in accordance with the generated upstream power back of mask.

11. Processor implementable instructions for causing an access device to operate in accordance with the method of claim 10.

12. A tangible carrier medium carrying the processor implementable instructions of claim 11.

13. The method of claim 10, wherein the at least one measurement related to an attenuation of signals comprises a measurement of an attenuation of signals transmitted by the other of the downstream or upstream modems at a plurality of different frequencies.

14. The method of claim 10, wherein the at least one measurement related to an attenuation of signals comprises a measurement of a function of an attenuation of signals transmitted by the other of the downstream or upstream modems at a plurality of different frequencies.

* * * * *